US007882129B1

(12) United States Patent
Williams

(10) Patent No.: US 7,882,129 B1
(45) Date of Patent: Feb. 1, 2011

(54) METHODS AND APPARATUSES FOR MEDIA FILE DELIVERY

(75) Inventor: Mark R. Williams, 682 S. Seventh St., San Jose, CA (US) 95112

(73) Assignee: Mark R. Williams, San Jose, CA (US)

( * ) Notice: Subject to any disclaimer, the term of this patent is extended or adjusted under 35 U.S.C. 154(b) by 0 days.

(21) Appl. No.: 09/652,387

(22) Filed: Aug. 31, 2000

(51) Int. Cl.
G06F 17/30 (2006.01)
(52) U.S. Cl. ........................ 707/780; 704/270
(58) Field of Classification Search ........................ None
See application file for complete search history.

(56) References Cited

U.S. PATENT DOCUMENTS

| | | | | |
|---|---|---|---|---|
| 5,729,741 A | * | 3/1998 | Liaguno et al. | 707/104.1 |
| 5,864,868 A | * | 1/1999 | Contois | 707/104.1 |
| 6,195,693 B1 | * | 2/2001 | Berry et al. | 709/219 |
| 6,282,549 B1 | * | 8/2001 | Hoffert et al. | 707/104.1 |
| 6,505,160 B1 | * | 1/2003 | Levy et al. | 704/270 |
| 7,565,294 B2 | * | 7/2009 | Rhoads | 704/270 |
| 2001/0039659 A1 | * | 11/2001 | Simmons et al. | |
| 2006/0129688 A1 | * | 6/2006 | Chatani et al. | 709/229 |

* cited by examiner

Primary Examiner—Debbie Le

(57) ABSTRACT

Methods and apparatuses whereby legally obtained media files are marked so they are associated with the legal owner. A legally obtained media file is delivered normally, without any form of interruption. However, when an illegally obtained media file is delivered, a message file is delivered in association with the media file.

According to an embodiment, a method of the invention comprises receiving a media file, retrieving an identifier that uniquely identifies a player unit, appending the identifier onto the media file, and storing the appended media file in a data storage medium.

According to another embodiment, a method of the invention comprises receiving a media file with a first identifier, retrieving a second identifier, comparing the first identifier with the second identifier, retrieving a message file from a non-volatile memory and producing a message output if the first identifier does not correspond to the second identifier, and producing a media output from the media file.

11 Claims, 6 Drawing Sheets

METHODS AND APPARATUSES FOR MEDIA FILE DELIVERY

BACKGROUND OF THE INVENTION

1. Field of the Invention

The invention relates generally to the field of media file delivery, and more particularly to methods and apparatuses for marking and identifying media files to determine whether to deliver a commercial message in association with the media file.

2. Background Information

With the evolution of the Internet has come the increased occurrence of copyrighted materials being illegally copied and distributed. As a result, there has been development in the areas of copyright protection (or field of rights management), and transaction tracking.

Rights management refers to methods for the "secure" delivery of copyrighted material, such as music and film, to limit the number of illegal copies made and distributed. For instance, the recording industry (represented by the RIAA) has chosen to work with music delivery equipment manufacturers to develop a uniform means of secure delivery through the Secure Digital Music Initiative (SDMI). Most companies associated with music distribution are involved with SDMI, a forum for agreement upon standard levels of copy security. Its current form allows a simple signing of a digital audio file to indicate that "no more copies" are allowed. A future version will introduce a standardized means of transmitting the "no more copies" indication along with other indications such as limited copying. SDMI is very restrictive in that it limits copying of even legitimately owned material to a finite number of times.

Transaction tracking refers to a method for returning information to the originator of the copyrighted material, such as the music distributor, production studio, artist, etc. This information can include the number of times a copyrighted material has been copied and/or listened to or viewed, and about who is the legal licensee of the recording. For instance, technologies exist that allow users who legally obtain copyrighted material to receive a version that is encrypted solely for that user. Copying the material to any other medium leaves it unusable. The purchase and distribution information is then passed back to the appropriate sources for billing.

SUMMARY OF THE INVENTION

The present invention addresses a need for protecting copyrighted material without unduly burdening those who legally obtain such material.

The invention provides methods and apparatuses whereby legally obtained media files are marked so they are associated with the legal owner. A legally obtained media file is delivered normally, without any form of interruption. However, when a media file of unknown origin is delivered, a message file is delivered in association with the media file.

According to one aspect of the invention, a method is disclosed that comprises receiving a media file, retrieving an identifier that uniquely identifies a player unit from a non-volatile memory, appending a copy of the identifier onto the media file, and storing the appended media file in a data storage medium.

According to another aspect of the invention, a method is disclosed that comprises receiving a media file with a first identifier, retrieving a second identifier from a non-volatile memory, comparing the first identifier with the second identifier, retrieving a message file from a non-volatile memory and producing a message output if the first identifier does not correspond to the second identifier, and producing a media output from the media file.

DETAILED DESCRIPTION OF THE INVENTION

Figure 1:
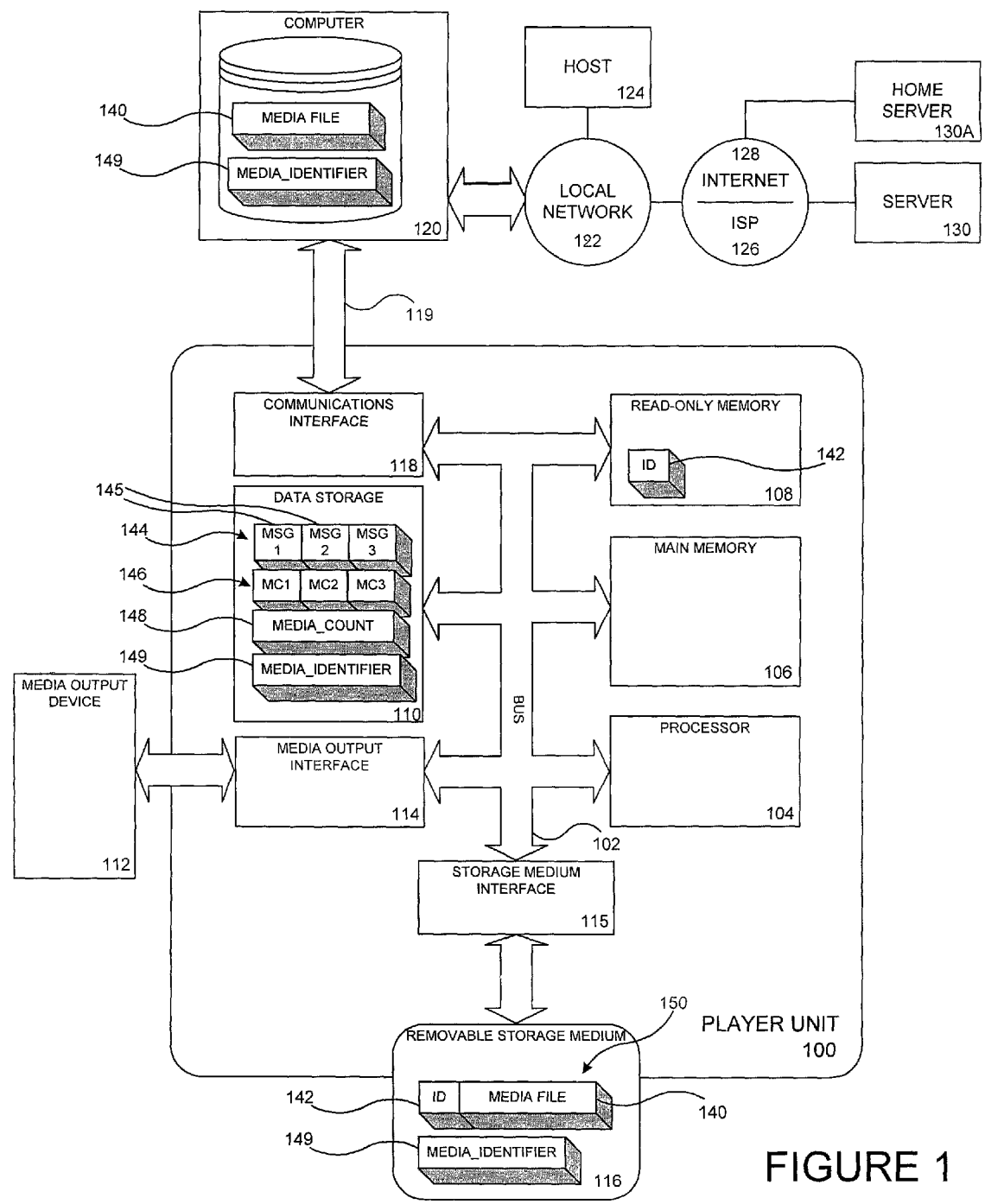
FIG. 1 illustrates a block diagram of an embodiment of a player unit configured to carry out the methods of the invention.

The invention is directed to methods and apparatuses for uniquely marking a media file, determining whether to deliver a message file in association with the media file, and tracking the number of times that the media file and the message file are delivered. The invention provides a mechanism by which media files (e.g. compressed music files such as MP3s) are uniquely marked when they are legally obtained. The legal licensor or owner can play the media file without interruption. However, if the media file is transferred to a user that did not legally obtain the media file, a message file (e.g. an advertisement) is played when the illegal user attempts to play the media file. The invention also tracks the number of times the media file and the message file are played. This tracking information can then be delivered to third parties who can use the gathered information for a variety of purposes, including to generate advertising revenue.

1. Terminology

The term "media file" refers to data files or software that convey sensory information to a person, such as visual information or audible information. The data files may be compressed or uncompressed. The visual information can take on many forms, including videos, animations, simulations, graphics, images, video games, and text. The audible information can take on many forms as well, including music, human speech, and sound effects.

The term "message file" refers to data files that convey a message to a person in the form of visual information or audible information. The visual or audible information can take the same forms as described with reference to the media file above, and can be compressed or uncompressed. As used herein, the difference between a message file and a media file is that a message file is typically much shorter in length, and is generally going to deliver a commercial message, a public service announcement, or some other form of message or sound. Examples of message files include an incentive for users to obtain a legal copy of the media file. Message files can also provide a means of securing revenue (e.g. through advertising) that can be channeled in part back to the copyright owner.

The term "media output" refers to the delivery of a media file. The media output is the actual image (or images) displayed on a display screen and/or sound delivered through a loudspeaker. This is distinguished from the media file itself, which is simply data in electronic form.

The term "message output" refers to the delivery of a message file. As explained with reference to "media output" above, the message output is the actual image or images displayed on a display screen and/or sound delivered through a loudspeaker.

The term "identifier" refers generally to a unique serial number or other identifying means associated with a player unit. In general, no two player units will have the same identifier, although there can be exceptions.

The term "player unit" refers to an apparatus for marking media files and delivering media files and message files. The player unit can also store media files on a removable storage medium after the media files have been marked.

The term "removable storage medium" refers to a data storage unit that can store media files. The removable storage medium can be inserted into, or coupled to, a player unit to allow for the transfer of data files between these two devices.

The term "MEDIA_COUNT" refers to a variable primarily stored in a player unit that tracks the number of times a particular media file has been delivered. Generally there is a separate MEDIA_COUNT variable for every media file.

The term "MESSAGE_COUNT" refers to a variable primarily stored in a player unit that tracks the number of times a particular message file has been delivered. Generally there is one MESSAGE_COUNT variable for each message file residing in the player unit.

The term "MEDIA_IDENTIFIER" refers to data primarily stored in a player unit that identifies a particular media file that has been delivered. The MEDIA_IDENTIFIER data file can identify the media file in a number of ways, such as by the owner of the legal rights to the media file, the originator of the media file, or the name of the content of the media file. Alternatively, it can comprise a derivation of an industry standard number encoded on the media file. It may even identify other information about the media file, such as its target audience, the subject matter of the media file, or what genre to which the media file belongs. There is at least one MEDIA_IDENTIFIER associated with each media file transferred into the player unit.

The term "legally obtained" refers to a media file that was obtained in a manner that was intended by the owner of the content of the media file. For example, if the media file comprises a song in MP3 format that is owned by a record label, an end user may legally obtain the media file by purchasing a license for the song.

The term "illegally obtained" refers to a media file that was obtained in a manner that was not intended by the owner of the content of the media file. For example, if the media file comprises a song in MP3 format that is owned by a record label, an end user may illegally obtain the media file by copying the media file from another end user.

2. Hardware Overview

FIG. 1 is a block diagram of an exemplary player unit 100 upon which methods of the invention can be implemented.

Player unit 100 includes a bus 102, or other communication mechanism for communicating information, and a processor 104 coupled with bus 102 for processing information. Processor 104 can comprise a central processing unit (CPU), such as the SuperH line of RISC microprocessors by Hitachi Semiconductor (America) Inc. Alternatively, processor 104 can comprise other forms of logic circuits, such as an Application Specific Integrated Circuit (ASIC) chips or a programmable digital signal processors (DSP), that implement the logic required to carry out the methods of the invention, including decompression logic to expand compressed audio or video files. ASICs are produced by several manufacturers, including Analog Devices and LSI Logic Corp. DSPs are manufactured by several companies including Cirrus Logic, Texas Instruments, Toshiba, and Xilinx. The processor 104 can also comprise any combination of a CPU, a DSP, and/or an ASIC, or another form of processor or microcontroller altogether.

Player Unit 100 also includes a main memory 106, such as a random access memory ("RAM"), or other dynamic (or "volatile") storage device, coupled to bus 102. The main memory 106 stores information and instructions executed by processor 104 during execution. Main memory 106 also stores temporary variables or other intermediate information during execution of instructions by processor 104. Player unit 100 further includes a read only memory ("ROM") 108 or other non-volatile (or "persistent") storage device (e.g., FLASH, PROM, EEPROM, etc.) coupled to bus 102. The ROM 108 stores static information and instructions for processor 104. It is worth noting that one or more banks of memory can comprise ROM 108. A data storage 110, such as FLASH memory, EEPROM, PROM, or other non-volatile memory, is also coupled to bus 102. The data storage 110 stores information such as data structures and instructions, for example data structures for data such as MEDIA_COUNT variable 148, MESSAGE_COUNT variable 146, MEDIA_IDENTIFIER 149, media file 140, message files 145, and/or structures relating to the operating system or application programs that use the operating system.

Player unit 100 further includes a media output interface 114 that can comprise a sound output and/or a video output adapter. Media output interface 114 generally includes a CODEC to transform digital signals into analog signals used to produce sound or images, and can include a graphics accelerator to improve the quality of video output. Media output interface 114 couples player unit 100 to a media output device 112, such as an audio loudspeaker and/or a display screen such as a cathode ray tube ("CRT") or an active or passive-matrix display. Media output device 112 presents sound and/or images to an end user and can be permanently coupled to player unit 100, or can be an external device altogether.

Player unit 100 also has a storage medium interface 115 to allow player unit 100 to be coupled to a removable storage medium 116, thereby enabling data transfer between the two devices. Interface 115 can comprise a drive, such as a disk drive, generally coupled to player unit 100 via an IDE or similar interface, and into which a removable storage medium 116 can be inserted. Removable storage medium 116 can comprise any of a number of portable storage devices that hold data files, such as the Sony MiniDisc, manufactured by Sony Corporation, the LS-120 Superdisk, manufactured by Imation Corp, or a CD-R, a CD-RW, or a FLASH memory card.

According to an aspect of the invention, processor 104 in player unit 100 executes one or more sequences of instructions contained in main memory 106. Such instructions are read into main memory 106 from another computer-readable medium, such as data storage 110, ROM 108, or removable storage medium 116. The instructions can be executable object code or interpreted code that is processed by a run-time engine (e.g., Javascript).

Execution of the sequences of instructions contained in main memory 106 causes processor 104 to perform the methods of the invention as described herein. In alternative embodiments, hard-wired circuitry, such as logic circuits, can be used in place of or in combination with software instructions to implement the invention. Such a device using hard-wired circuitry is available from Thomson Electronics. Thus, embodiments of the invention are not limited to any specific combination of hardware circuitry and software.

The term "computer-readable medium" as used herein refers to any medium that participates in providing instructions to processor 104 for execution. Such a medium can take many forms, including but not limited to, non-volatile media, volatile media, and transmission media. Non-volatile media includes, for example, FLASH, EEPROM, and PROM, such as data storage 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infrared data communications.

Common forms of computer-readable media include a floppy disk, a flexible disk, a hard disk, a magnetic tape, or any other magnetic media, a CD-ROM, a DVD, any other optical media, punchcards, a paper-tape, any other physical media with patterns of holes, a RAM, a ROM, a FLASH, or any other memory chip or cartridge, a carrier wave as described hereinafter, or any other media from which a computer can read.

Player unit 100 also includes a communications interface 118 coupled to bus 102. Communications interface 118 provides a two-way data communication coupling to a computer system 120 that is connected to a network 122. For example, communications interface 118 can be a Universal Serial Bus (USB) port or an IEEE 1394 port that allows for a connection to computer system 120. As another example, communications interface 118 can be a local area network ("LAN") card to provide a data communication connection to a compatible LAN. Wireless links can also be implemented, such as ports using IrDA technology or Bluetooth technology. In any such implementation, communications interface 118 sends and receives electrical, electromagnetic or optical signals that carry digital data streams representing various types of information.

Computer system 120 preferably provides data communication through one or more networks 122 to other data devices. For example, computer system 120 can provide a connection through local network 122 to a host computer 124 or to data equipment operated by an Internet Service Provider ("ISP") 126. ISP 126 in turn provides data communication services through the "Internet" 128 to other servers 130 and 130A. Local network 122 and Internet 128 both use electrical, electromagnetic or optical signals that carry digital data streams. The signals through the various networks and the signals on network 122 and through communication interface 118, which carry the digital data to and from computer system 100, are exemplary forms of carrier waves transporting the information.

Computer system 120 can send messages and receive data, including data files, through the network(s), network 122 and communications interface 118. In the Internet example, a server 130 or 130A might transmit data files through Internet 128, ISP 126, and local network 122. The data files can then be sent to player unit 100 through communications link 119 via communications interface 118. In accordance with the invention, such data files include media files 140 and message files 145, as described herein.

The media files 140 and message files 145 can be processed by processor 104 when transferred to player unit 100 through communications interface 118. When transferred to player unit 100, the media files and message files can be stored in main memory 106, data storage 110, removable storage medium 116, or other non-volatile storage for later execution. In this manner, player unit 100 can obtain data files in the form of a carrier wave.

3. Methods for Appending Identifiers to Media Files

Figure 2:
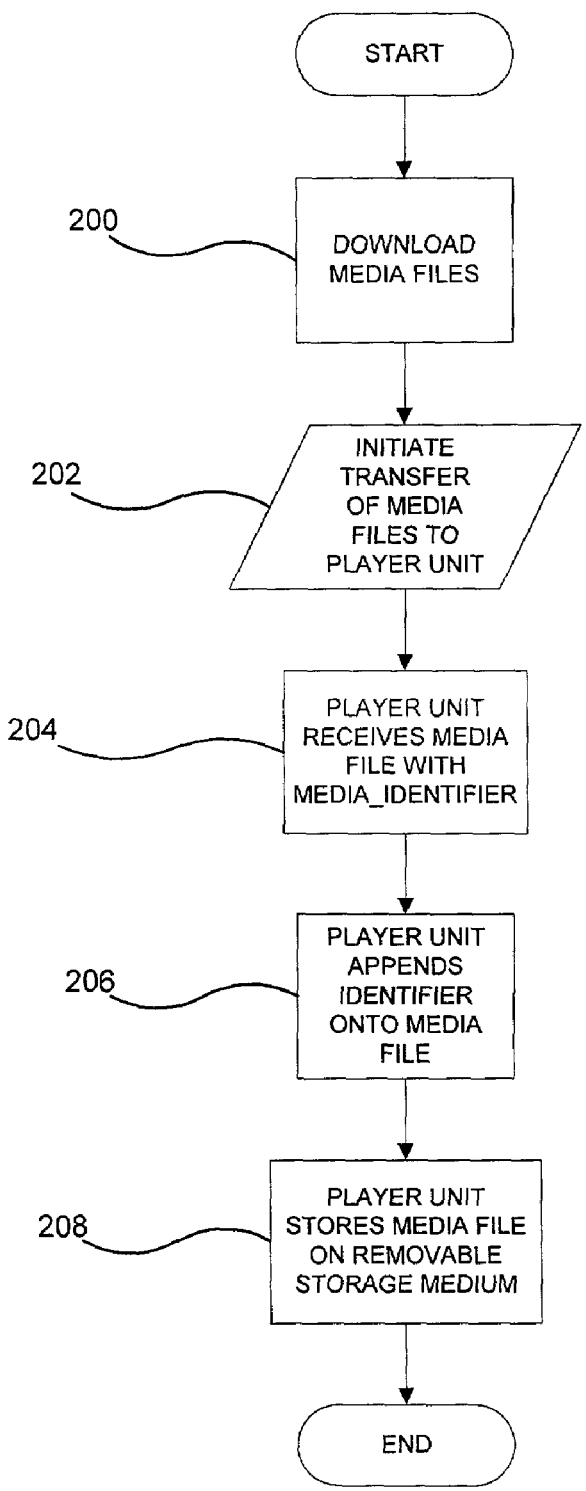
FIG. 2 is a flowchart depicting a conceptual overview of a method for uniquely marking a media file in accordance with various embodiments of the invention.

Turning to FIG. 2, a flowchart depicting a conceptual overview of a method for appending identifiers to media files in accordance with the invention is shown. In the first step 200, media files 140 are downloaded and stored on a computer system 120. This is also shown in FIG. 1 as media file 140 is disposed within computer system 120. Media files 140 generally originate from server 130 and arrive at computer system 120 via a communications network such as the Internet 128. Alternately, media files 140 can be loaded directly onto computer system 120 by a user, for instance off of a magnetic or optical disk, or by wireless transfer.

The next step 202 is to transfer media files 140 from computer system 120 to a player unit 100. An end user generally initiates this transfer by selecting one or more media files 140 that he or she wants to store on a removable storage medium 116, or within player unit 100 itself (e.g. in data storage 100). The transfer can take place over communications link 119 via communications interface 118. Accordingly, player unit 100 has to be linked to computer system 120, for instance via a cable linking communications interface 118 to a USB port or IEEE 1394 port on computer system 120, or via a wireless connection using IrDA or Bluetooth technology.

As media files 140 are transferred out of computer system 120, in step 204, player unit 120 receives the media files 140 that were transferred out of the computer system 120. MEDIA_IDENTIFIER 149 is also sent to player unit 100 to provide a means for identifying media file 140.

In step 206, player unit 100 appends a copy of identifier 142 onto each media file 140 as it is received. Identifier 142 is data that uniquely identifies player unit 100, and is stored in a non-volatile memory within player unit 100, such as in read-only memory 108 (shown in FIG. 1) or data storage 110. Preferably, no two player units 100 will have the same identifier 142.

Identifier 142 typically comprises a set of alphanumeric characters, and may even include non-alphanumeric characters. An electronic serial number of player unit 100, stored in a non-volatile memory such as data storage 110 or read-only memory 108, is preferably used as player unit 100's identifier 142. In such a case, all or a representative version of the serial number can be appended to media file 140. Player unit 100 can append identifier 142 onto the beginning or end of media file 140, or can weave or encrypt identifier 142 within media file 140 itself, using the same or a different file format as media file 140.

With identifier 142 appended to it, media file 140 is now directly associated with the original player unit 100 that received media file 140 and created the linked media file 140 and identifier 142. The combination of media file 140 and identifier 142 is herein referred to as an appended media file 150.

In step 208, player unit 100 stores appended media file 150 on a removable storage medium 116, which is seen in FIG. 1. The data transfer takes place via storage medium interface 115. Appended media file 150 can now be played by player unit 100 or transferred to another player unit either by withdrawing removable storage medium 116 from player unit 100 and inserting it into another player unit, or via wireless transfer from one player unit to another. Alternatively, appended media file 150 can be stored within player unit 100 itself, for instance within data storage 110.

In an alternative embodiment, identifier 142 can comprise any of a number of different derivations of an electronic serial number of player unit 100, such that while media files 140 will always have an identifier 142 that corresponds to the electronic serial number of player unit 100, media file identifier 142 cannot be decoded to determine the exact electronic serial number of player unit 100 from which it was derived. This embodiment provides consumers with greater privacy because identifier 142 on media file 140 does not divulge the serial number of player unit 100, and therefore the specific player unit 100 that created the appended media file 150 cannot be easily traced.

In another alternative embodiment, player unit 100 can append data files other than identifiers 142 to media file 140. For instance, player unit 100 can append a message file 145 to media file 140. Message file 145 can be retrieved from a non-volatile memory within player unit 100. Accordingly, when media file 140 is illegally copied to another data storage device, message file 145 is copied as well. This provides for the delivery of message file 145 in association with the delivery of the illegal media file 140.

4. Methods for Delivering Message Files with Media Files

Figure 3:
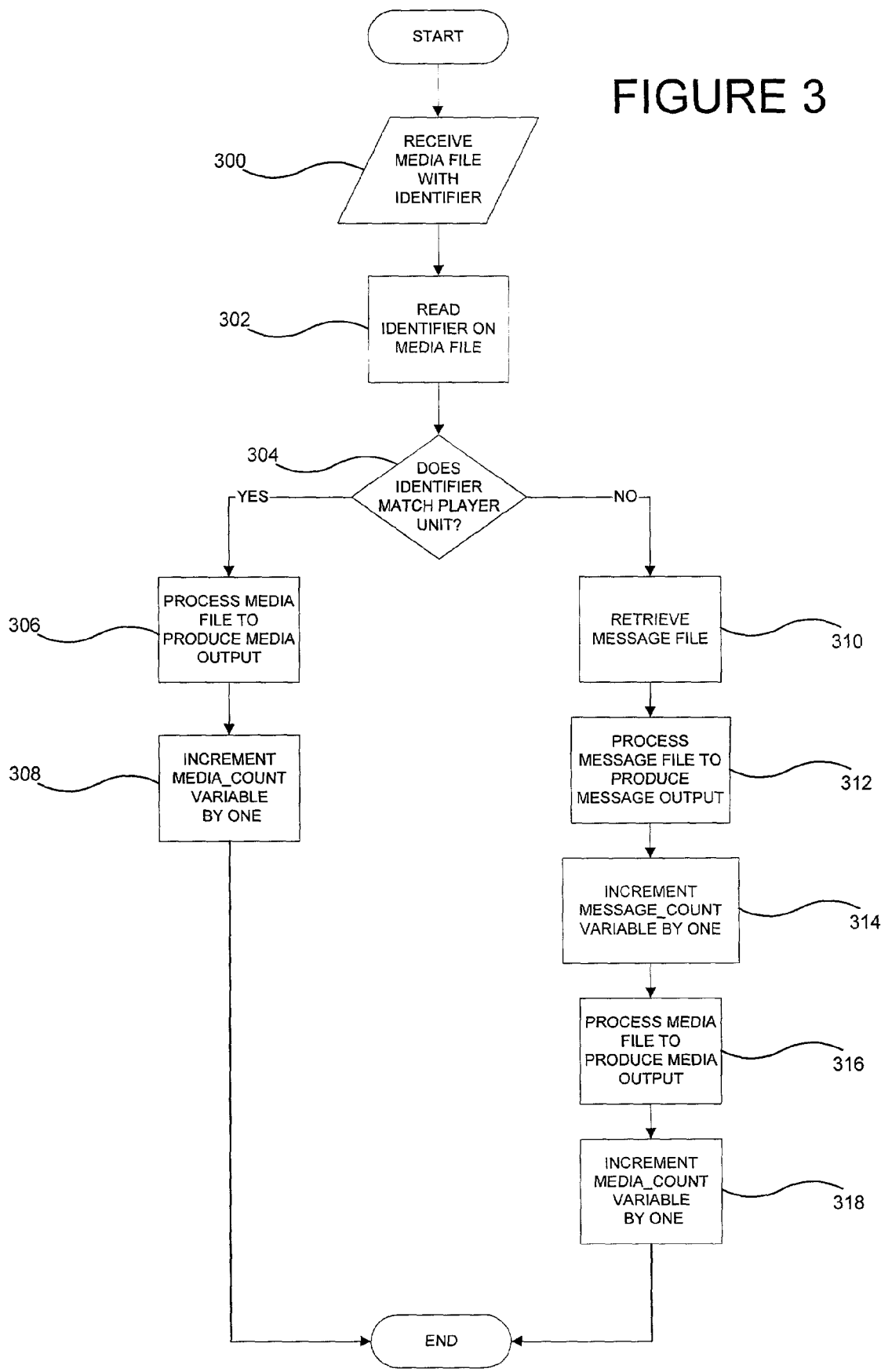
FIG. 3 is a flowchart depicting a method for delivering a message file in accordance with various embodiments of the invention.

Turning to FIG. 3, a flowchart depicting a method for delivering message files in accordance with the invention is shown. Starting with step 300, player unit 100 receives an appended media file 150'. For purposes of clarity with reference to FIGS. 3 and 4, reference numerals ending in a single quote (') relate to data files, such as media files 140 and message files 145, that have been received by player unit 100 from a source other than computer system 120. Along with appended media file 150', player unit 100 generally also receives a MEDIA_IDENTIFIER 149' that identifies appended media file 150'.

Appended media file 150' generally arrives within player unit 100 via a removable storage medium 116. Alternatively, appended media file 150' may arrive within player unit 100 by wireless transfer, for instance by an infrared data transfer from another player unit or device. After arriving within player unit 100, appended media file 150' and MEDIA_IDENTIFIER 149 can be stored in data storage 110 or main memory 106, or can be kept on removable storage medium 116.

Moving to step 302, processor 104 of player unit 100 retrieves and processes identifier 142' of appended media file 150' to analyze its contents. This provides player unit 100 with data, such as a representative portion of a serial number, that identifies the specific player unit that created appended media file 150'.

Moving to step 304, processor 104 retrieves player unit 100's own identifier 142. This identifier can be stored in data storage 110 or read-only memory 108. Once retrieved, processor 104 compares identifier 142 of player unit 100 to identifier 142' of appended media file 150'. This comparison is done to determine whether identifier 142' was derived from identifier 142 of player unit 100. If processor 104 determines that identifier 142' was indeed derived from identifier 142 of player unit 100, then appended media file 150' was created in player unit 100 itself and steps 306 and 308 of FIG. 3 are followed. Otherwise, appended media file 150' was created in a different player unit, and steps 310 through 318 of FIG. 3 are followed.

Moving to step 306, if identifier 142' of appended media file 150' corresponds to (i.e. was derived from) identifier 142 of player unit 100, processor 104 retrieves and processes media file 140' to deliver a media output. As described above, the media output comprises sound and/or images that are delivered through media output device 112. Media file 140' is simply a representation of the sound and/or images in electronic data form. The output is sent to media output device 112 via a media output interface 114.

In step 308, processor 104 then increments a MEDIA_COUNT variable 148 by one unit. MEDIA_COUNT variable 148 is an integer that represents how many times a particular media file 140 has been delivered. A different MEDIA_COUNT variable 148 exists for each media file 140. MEDIA_COUNT variable 148 is stored in data storage 110 of player unit 100 (as shown in FIG. 1), can be used for tracking purposes, and is described further with reference to FIGS. 5A and 5B below.

Moving to the second path of the flowchart at step 310, if identifier 142' of appended media file 150' does not correspond to identifier 142 of player unit 100, processor 104 retrieves a message file 145 from MESSAGE_BLOCK 144. MESSAGE_BLOCK 144 comprises a series of message files 145 that are generally downloaded from computer system 120. MESSAGE_BLOCK 144 is stored in data storage 110 of player unit 100 (as shown in FIG. 1), or alternatively removable storage medium 116, and is described further with reference to FIGS. 5A and 5B below. Message file 145 comprises a specific type of data file, which was defined above. The message file 145 that is retrieved can be a randomly chosen message file 145, or it may be selected based upon some relationship to media file 140. For example, if media file 140 is an MP3 audio file of classical music, the message file 145 that is chosen may be one that is targeted to listeners of classical music. An additional data structure can be used to associate certain message files 145 with certain media files 140 or certain MEDIA_IDENTIFIERS 149, or MEDIA_IDENTIFIER 149 can hold this association information.

Moving to step 312, once message file 145 has been retrieved, processor 104 processes message file 145 to produce a message output. The message output is delivered through media output device 112 via media output interface 114. Then, as shown in step 314, processor 104 increments a MESSAGE_COUNT variable 146 by one unit. MESSAGE_COUNT variable 146 is an integer that represents how many times a particular message file 145 has been delivered. A different MESSAGE_COUNT variable 148 exists for each message file 145. MESSAGE_COUNT variables 146 for the message files 145 are stored in data storage 110 of player unit 100 (shown as MC1, MC2, and MC3 in FIG. 1). They can be used for tracking purposes and are described further with reference to FIGS. 5A and 5B below.

Moving to step 316, processor 104 next retrieves and processes media file 140' to deliver a media output, the output being sent to media output device 112 via a media output interface 114. Then, as shown in step 318, processor 104 increments MEDIA_COUNT variable 148 by one unit. Again, MEDIA_COUNT variable 148 represents how many times a particular media file has been delivered, and is described further with reference to FIGS. 5A and 5B below.

In the event that no MESSAGE_BLOCK 144 or message file 145 exists within player unit 100, steps 310 to 318 are not carried out. In other words, if identifier 142' of appended media file 150' does not match identifier 142 of player unit 100, and there is no deliverable message file 145, the invention does not allow media file 140' to be delivered.

Figure 4:
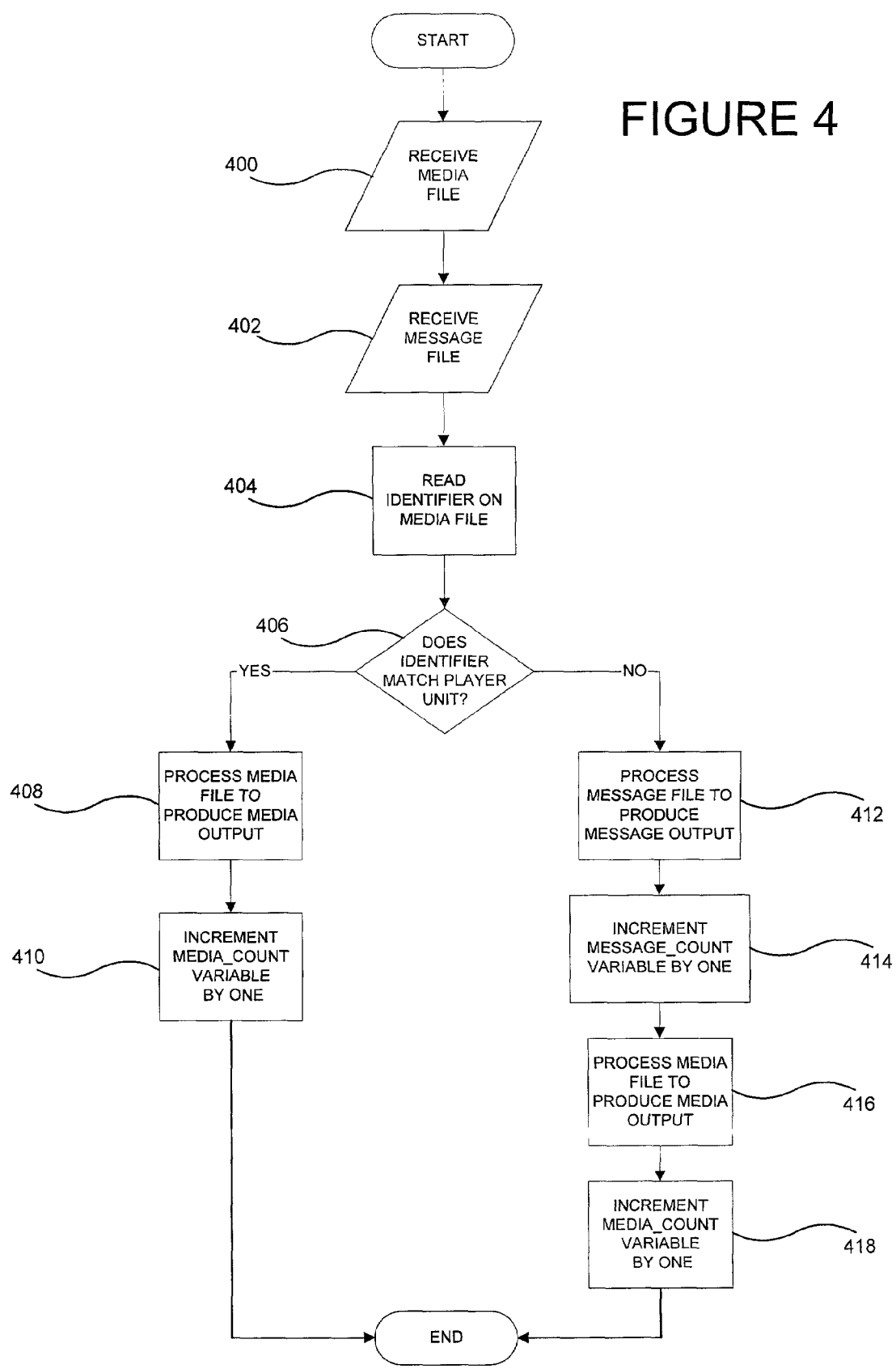
FIG. 4 is a flowchart depicting an alternative method for delivering a message file in accordance with various embodiments of the invention.

Turning now to FIG. 4, a flowchart depicting an alternative method for delivering message files in accordance with the invention is shown. Starting with steps 400 and 402, player unit 100 receives an appended media file 150' and a message file 145'. Appended media file 150' and message file 145' generally arrive by way of a removable storage medium 116, or by wireless transfer, and can arrive in a concatenated state. Along with appended media file 150', player unit 100 generally also receives a MEDIA_IDENTIFIER 149' that identifies appended media file 150'. After arriving within player unit 100, media file 140', MEDIA_IDENTIFIER 149, and message file 145' can be stored in data storage 110 or main memory 106, or can be kept on removable storage medium 116.

Moving to step 404, processor 104 of player unit 100 analyzes the contents of identifier 142' of appended media file 150'. This again provides player unit 100 with some form of identifying data for the specific player unit that created appended media file 150'.

Moving to step 406, processor 104 retrieves player unit 100's own identifier 142, and compares it to identifier 142' of appended media file 150'. Again, if identifier 142' was derived from identifier 142 of player unit 100, appended media file 150' was created in player unit 100 itself and steps 408 and 410 of FIG. 4 are followed. However, if identifier 142' was not derived from identifier 142 of player unit 100, appended media file 150' was created in a different player unit and steps 412 through 418 of FIG. 4 are followed.

Moving to step 408, if identifier 142' of appended media file 150' corresponds to identifier 142 of player unit 100, processor 104 retrieves and processes media file 140' to deliver a media output through media output device 112. Also, as shown in step 410, processor 104 increments MEDIA_COUNT variable 148 by one unit.

Moving to the second path of the flowchart at step 412, if identifier 142' does not correspond to identifier 142 of player unit 100, processor 104 retrieves message file 145' (which arrived with media file 140') and processes message file 145' to produce a message output. The message output is then delivered through media output device 112 via media output interface 114. Next, as shown in step 414, processor 104 increments MESSAGE_COUNT variable 146 by one unit.

In step 416, processor 104 next retrieves and processes media file 140' to deliver a media output, the output again being sent to media output device 112 via media output interface 114. Then, as shown in step 418, processor 104 increments MEDIA_COUNT variable 148 by one unit.

5. Methods for Tracking Delivery of Media and Message Files

Figure 5A:
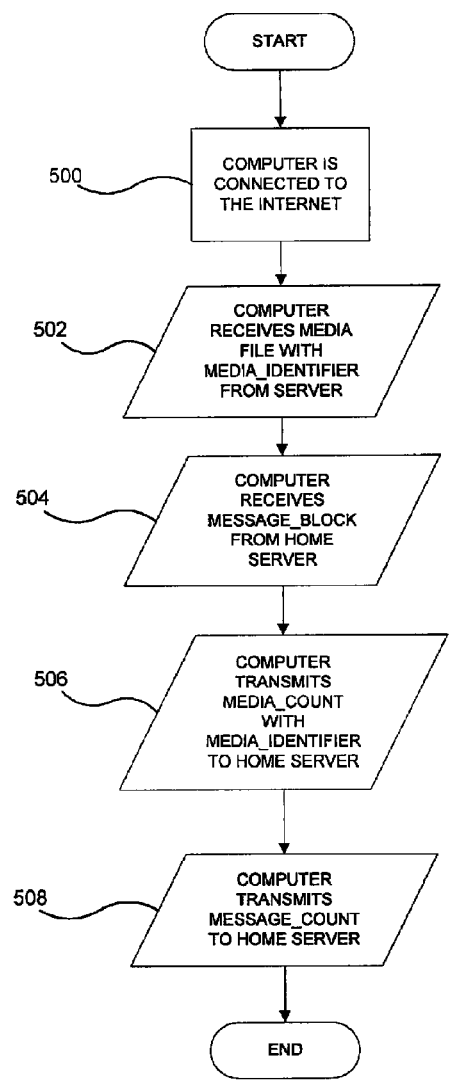
FIGS. 5A and 5B are flowcharts depicting a method for tracking the delivery of media files and message files in accordance with various embodiments of the invention.
Figure 5B:
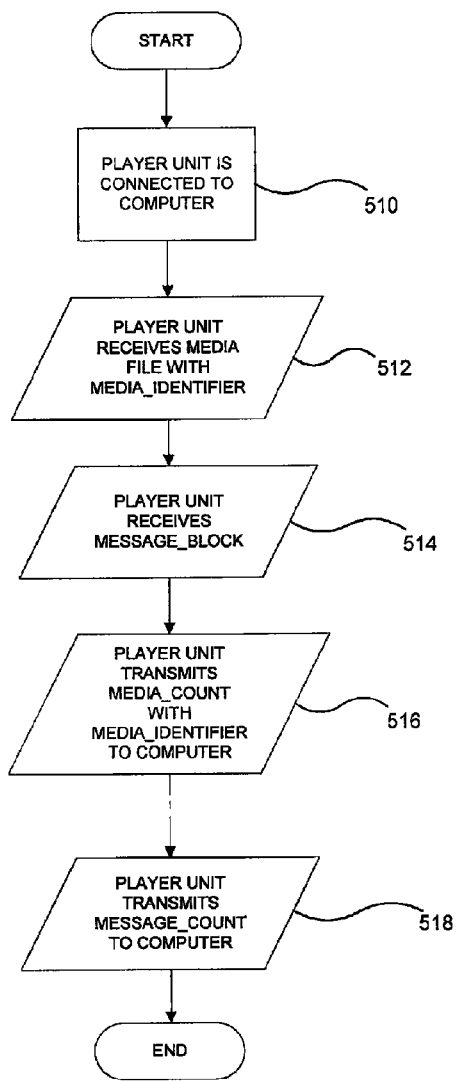

Turning now to FIGS. 5A and 5B, two flowcharts depicting a method for tracking delivery of media files 140 and message files 145 in accordance with the invention are shown. The first flowchart (steps 500 to 508) depicts a process that occurs when computer system 120 is connected to a communications network such as the Internet 128. The second flowchart (steps 510 to 518) depicts a process that occurs when player unit 100 is connected to computer system 120.

In step 500 in FIG. 5A, computer system 120 is connected to a communications network, such as the Internet 128, to carry out the transmission of media files 140 using communication lines. These communication lines can comprise phone lines, ISDN lines, cable lines, T-1 lines, T-3 lines, E-1 lines, or any other communication lines used to transfer data. Other communications networks, including local area networks (e.g. company intranets) or point-to-point connections can be used as well.

While connected to the Internet 128, an end user can visit websites and request media files 140 from server 130. For example, an end user may compensate certain businesses with money or other forms of compensation in exchange for the right to legally obtain media files 140. Once the legal rights are obtained, server 130 will transfer one or more media files 140 to computer system 120.

Moving to step 502, computer system 120 receives one or more media files 140 from server 130. Each media file 140 comes with an associated MEDIA_IDENTIFIER 149 containing data that identifies its respective media file 140. Each media file 140 generally has its own MEDIA_IDENTIFIER 149. Media files 140 and MEDIA_IDENTIFIERS 149 are downloaded onto a data storage device within computer system 120, such as a hard disk or hard drive, a CD-R drive, or other magnetic or optical disk drives. Media files 140 and MEDIA_IDENTIFIERS 149 are stored within computer system 120 until the end user initiates the process whereby these data files are transferred into player unit 100.

Moving to steps 504 to 508, at any time while connected to the Internet 128, computer system 120 performs a number of "background" data transfers, which comprise data transfers not initiated by the end user and designed to go substantially unnoticed by the user. As shown in step 504, one of these background data transfers comprises a download by computer system 120 of an updated MESSAGE_BLOCK 144 data file. The updated MESSAGE_BLOCK 144 data file is obtained from home server 130A, and software residing on computer system 120 is configured to contact home server 130A and download MESSAGE_BLOCK 144 during the background data transfer. This updated MESSAGE_BLOCK 144 is used to replace the existing MESSAGE_BLOCK 144 in player unit 100, providing an up-to-date rotation of message files 145 for delivery. In an alternative embodiment, a default MESSAGE_BLOCK 144 can be used in lieu of updated MESSAGE_BLOCKS 144, for instance when an updated MESSAGE_BLOCK 144 is unavailable.

Home server 130A comprises a server connected to the Internet 128, or some other communications network, that is set up to exchange specific data with computer system 120 during the background transfers. Such data includes MESSAGE_BLOCK 144 data, as demonstrated above, and includes other data as described below. In an embodiment of a business model of the invention, home server 130A can be owned and operated by a company that is somehow related to the manufacturer of player unit 100.

Moving to steps 506 and 508, the next two background data transfers comprise uploading the most recent MEDIA_COUNT variables 148 (along with copies of relevant MEDIA_IDENTIFIERS 149 that identify to which media files 140 the MEDIA_COUNT variables 148 relate) and MESSAGE_COUNT variables 146 from computer system 120 to home server 130A. As explained below, when computer system 120 is connected to player unit 100 it obtains the most recent MEDIA_COUNT variables 148 (with relevant MEDIA_IDENTIFIERS 149) and MESSAGE_COUNT variables 146 from player unit 100. Then, during the background data transfers of steps 506 and 508, this data is transferred to home server 130A.

Each MEDIA_IDENTIFIER 149 identifies a media file 140, while an associated MEDIA_COUNT variable 148 discloses the number times that media file 140 was delivered. Also, each MESSAGE_COUNT variable 146 discloses the number of times a particular message file 145 or media file 140 was delivered. The businesses that collect this data via home server 130A can use the information for a variety of purposes, for instance, generating advertising revenue based upon the number of times a particular message file 145 was delivered.

Moving to FIG. 5B, a process that occurs when player unit 100 is connected to computer system 120 is shown. Starting with step 510, player unit 100 is connected to computer system 120. This procedure is generally carried out by an end user. As described above, there are a number of ways to connect player unit 100 to computer system 120, including a USB port or an IEEE 1394 port.

Moving to step 512, one or more media files 140, along with associated MEDIA_IDENTIFIERS 149, are then transferred from computer system 120 to player unit 100. Generally the end user initiates this transfer of media files. Once the media files 140 enter player unit 100, the methods described above for appending identifiers 142 to media files 140 can be carried out.

Moving to steps 514 to 518, background data transfers occur between player unit 100 and computer system 120 at some time when the two devices are connected. As shown in step 514, in one background data transfer, the updated MESSAGE_BLOCK 144 that was downloaded by computer system 120 in step 504 is now transferred to player unit 100.

MESSAGE_BLOCK 144 is then stored (e.g. in data storage 110), and the previous MESSAGE_BLOCK 144 is removed. Through this process, player unit 100 receives an updated series of message files 145 that can be delivered through player unit 100.

Moving to steps 516 and 518, two more background data transfers that take place comprise player unit 100 transferring MEDIA_COUNT variables 148 (with associated MEDIA_IDENTIFIERS 149) and MESSAGE_COUNT variables 146 to computer system 120. Again, these variables track how often each media file 140 and each message file 145 is delivered through player unit 100. Computer system 120 then stores this data until a connection to the Internet 128 is established, which allows computer system 120 to upload the data to home server 130A during a background data transfer, as described above with reference to steps 506 and 508.

Figure 6:
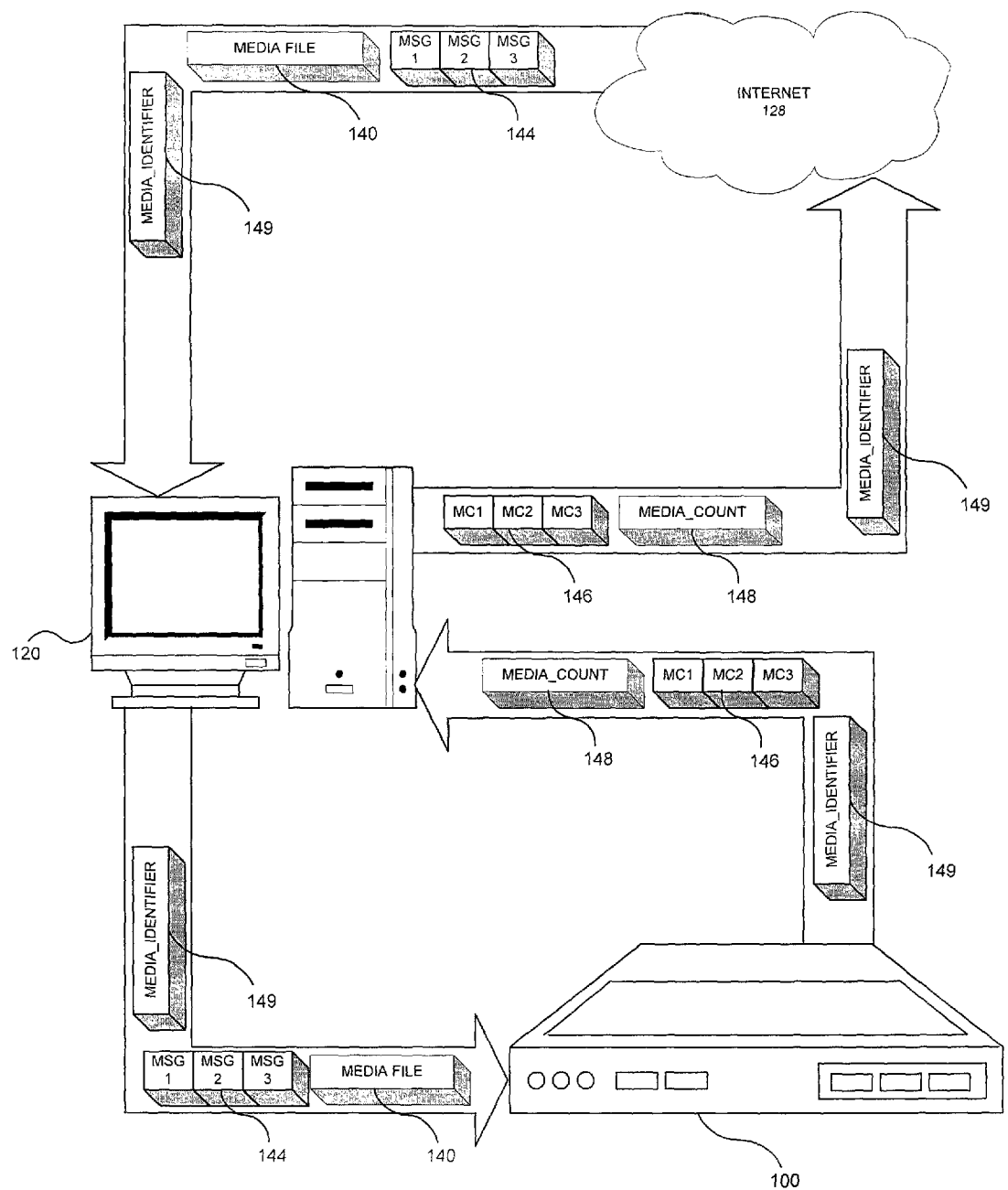
FIG. 6 is a graphical representation of a method for tracking the delivery of media files and message files in accordance with various embodiments of the invention.

Turning now to FIG. 6, a graphical representation of data flow during the various methods of the invention for tracking media file and message file delivery is shown. Media file 140 (with an associated MEDIA_IDENTIFIER 149) and MESSAGE_BLOCK 144 are created and placed on servers 130 and/or 130A (not shown) for downloading via the Internet 128. Accordingly, when requested for by computer system 120, media file 140, MEDIA_IDENTIFIER 149, and MESSAGE_BLOCK 144 are transferred from servers 130 and/or 130A via the Internet 128 to computer system 120. Then when computer system 120 is connected to player unit 100, media file 140, MEDIA_IDENTIFIER 149, and MESSAGE_BLOCK 144 are transferred to player unit 100.

While computer system 120 is connected to player unit 100, MEDIA_COUNT variables 148 (with copies of associated MEDIA_IDENTIFIERS 149) and MESSAGE_COUNT variables 146 are transferred from player unit 100 to computer system 120 during a background transfer. Then, when computer system 120 is connected to Internet 128, these variables are again transferred during a background transfer, but this time the variables are sent from computer system 120 to home server 130A that is part of the Internet.

Methods and apparatuses for appending identifiers to media files, for delivering message files, and for tracking delivery of media files and message files have been disclosed. In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than restrictive sense.

What is claimed is:

1. A method for delivering an audio data file, comprising:
receiving an audio data file into a local audio player unit, wherein:
a first alphanumeric identifier identifies the local audio player unit, and
a second alphanumeric identifier is appended to the audio data file and identifies an audio player unit;
comparing the first alphanumeric identifier with the second alphanumeric identifier to determine whether they match;
if the first alphanumeric identifier does match the second alphanumeric identifier, the method further comprises:
producing an audio output from the audio data file, else
if the first alphanumeric identifier does not match the second alphanumeric identifier, the method further comprises:
retrieving an advertising message file previously copied to a storage device of the local audio player unit and producing an advertising message audio output from the advertising message file, and
producing an audio output from the audio data file.

2. The method of claim 1, wherein the first alphanumeric identifier is retrieved from a non-volatile memory of the local audio player unit.

3. The method of claim 1, wherein the step of retrieving an advertising message file comprises retrieving an advertising message file from a non-volatile memory of the local audio player unit.

4. The method of claim 1, wherein the advertising message file contains one or more messages.

5. The method of claim 1, wherein the audio data file and the advertising message file are in a concatenated state.

6. The method of claim 1, wherein if the advertising message file cannot be retrieved, then the step of producing an audio output is not carried out.

7. The method of claim 1, wherein the alphanumeric identifier comprises a derivative of an electronic serial number of the audio player unit.

8. The method of claim 1, further comprising receiving an audio data identifier that uniquely identifies the audio data file.

9. An audio player unit for delivering audio data files, comprising:
a processor;
a non-volatile memory communicatively coupled to the processor;
a first alphanumeric identifier stored in the non-volatile memory, wherein the first alphanumeric identifier uniquely identifies the audio player unit;
a communications port communicatively coupled to the processor and capable of communicatively coupling the audio player unit to a computer system;
a data storage drive communicatively coupled to the processor and capable of transferring data between the audio player unit and a data storage medium;
a first application program residing in the audio player unit and accessible by the processor, the application program comprising one or more sequences of instructions for uniquely marking an audio data file, the one or more sequences of instructions causing the processor to perform a number of acts, said acts comprising:
receiving an audio data file,
retrieving the first alphanumeric identifier from the non-volatile memory,
appending the first alphanumeric identifier to the audio data file, and storing the appended audio data file in a data storage medium; and a second application program residing in the audio player unit and accessible by the processor, the application program comprising one or more sequences of instructions for delivering an audio data file, the one or more sequences of instructions causing the processor to perform a number of acts, said acts comprising:

receiving an audio data file with a second alphanumeric identifier, comparing the second alphanumeric identifier to the first alphanumeric identifier to determine whether they match, if the second alphanumeric identifier does match the first alphanumeric identifier, then the acts further comprise producing an audio output from the audio data file, else if the second alphanumeric identifier does not match the first alphanumeric identifier, then the acts further comprise retrieving an advertising message file from the non-volatile memory and producing an advertising message audio output from the advertising message file, and producing an audio output from the audio data file.

10. An audio player unit for delivering audio data media files, comprising:

a first logic circuit configured to perform a number of acts, said acts comprising:

receiving an audio data file, retrieving a first alphanumeric identifier that uniquely identifies the audio player unit, appending a representation of the first alphanumeric identifier to the audio data file, and storing the appended audio data file in a data storage medium;

a second logic circuit configured to perform a number of acts, said acts comprising:

receiving an audio data file with a second alphanumeric identifier, comparing the second alphanumeric identifier to the first alphanumeric identifier to determine whether the second alphanumeric identifier is a representation of the first alphanumeric identifier, if the second alphanumeric identifier is a representation of the first alphanumeric identifier, then the acts further comprise producing an audio output from the audio data file, else if the second alphanumeric identifier is not a representation of the first alphanumeric identifier, then the acts further comprise retrieving an advertising message file from the non-volatile memory and producing an advertising message audio output from the advertising message file, and producing an audio output from the audio data file;

a non-volatile memory communicatively coupled to the logic circuits for storing the first alphanumeric identifier;

a communications port communicatively coupled to the logic circuits and capable of communicatively coupling the audio player unit to a computer system; and a data storage drive communicatively coupled to the logic circuits and capable of transferring data between the audio player unit and a data storage medium.

11. The method of claim 8, wherein the audio data identifier is derived from an industry standard number encoded on the audio data file.

\* \* \* \* \*